United States Patent [19]

Knoll et al.

[11] Patent Number: 4,754,539
[45] Date of Patent: Jul. 5, 1988

[54] METHOD AND EXTRACTOR DEVICE FOR SEPARATING WORM ELEMENTS OF AN EXTRUDER FROM A WORM SHAFT

[75] Inventors: Arno Knoll; Gerhard Pfaff, both of Stuttgart; Wolfgang Worz, Illingen, all of Fed. Rep. of Germany

[73] Assignee: Werner & Pfleiderer GmbH, Stuttgart, Fed. Rep. of Germany

[21] Appl. No.: 34,081

[22] Filed: Apr. 1, 1987

[30] Foreign Application Priority Data

Apr. 3, 1986 [DE] Fed. Rep. of Germany ....... 3611113

[51] Int. Cl.⁴ .............................................. B23P 19/04
[52] U.S. Cl. .................................. 29/159.2; 29/251; 29/252; 29/255; 29/426.5; 173/90; 173/122
[58] Field of Search ...................... 29/159.2, 251, 252, 29/254, 255, 426.5, 234, 239; 173/90, 91, 122

[56] References Cited

U.S. PATENT DOCUMENTS

Re. 28,151 9/1974 Cook ....................................... 173/91
3,061,914 11/1962 Johnston ................................ 29/252
4,014,392 3/1977 Ross ..................................... 173/122

Primary Examiner—P. W. Echols
Attorney, Agent, or Firm—Roberts, Spiecens & Cohen

[57] ABSTRACT

An extractor for removing worm elements which are fastened for rotation on the worm shaft of a worm extruder wherein a frame formed of longitudinal and cross members has a locking device in one of the cross members for holding the worm elements and an opposed, displaceable, pneumatic piston-cylinder unit on another cross member. The piston-cylinder unit has a pressure piston which is extendable axially towards the worm shaft. Between the worm shaft and the piston-cylinder unit is a slide which is displaceable longitudinally and can be engaged by the piston of the piston-cylinder unit. The slide carries an impact device which is pneumatically actuatable and includes an impact shaft for engaging the worm shaft. The locking device includes two clamp jaws which are axially aligned with the impact shaft and the piston and engage the worm profile with an inner profile surface of identical type.

12 Claims, 2 Drawing Sheets

METHOD AND EXTRACTOR DEVICE FOR SEPARATING WORM ELEMENTS OF AN EXTRUDER FROM A WORM SHAFT

FIELD OF THE INVENTION

The present invention relates to an extractor or detaching apparatus for separating worm elements which are fixed on the worm shaft of a worm extruder.

More particularly, the invention relates to an extractor which employs a frame having longitudinal and cross members, a clamping means in one of the cross members for securely holding the worm elements and a piston-cylinder unit opposite the clamping means and carried by a movable cross member which can be secured in a particular location such that extension of the piston from the piston-cylinder unit can act on the worm shaft to apply axial force thereto to separate the shaft from the worm elements.

PRIOR ART

In the known extractors, the worm elements are separated from the worm shaft by the action of hydraulic force acting on the piston of the pressure cylinder and the shaft is separated under relatively high hydraulic pressure load while the worm elements are held in secured position.

Since, in most cases replacement of the worm elements becomes necessary only after a relatively lengthy period of operation, the worm elements usually adhere very tightly to the worm shaft and very high forces are necessary for the separation. Frequently, the worm shaft and the worm elements themselves are damaged, so that it is no longer possible to use them again.

A further disadvantage is that, depending on the nature of the product prepared in the extruder, melts which have penetrated over a long period of time between the worm shaft and the worm elements have a detrimental effect on the adherence of the worm elements.

Namely, initially the worms are usually mounted on the shafts for rotation therewith, for example, by a keyway or the like and after a period of operation, the worms become fixedly secured to the shafts.

SUMMARY OF THE INVENTION

An object of the present invention is to provide an extractor for separating worm elements from worm shafts which is simple in construction and facilitates the loosening of the worm elements from the worm shaft for their reuse.

This object is achieved in accordance with the invention by the provision between the clamping means and the piston-cylinder unit of a slide which is mounted on the frame for longitudinal travel on the longitudinal members of the frame. The slide supports a pneumatically actuatable impact means, in the form of an air hammer, which has an impact shaft extending longitudinally for engaging the worm shaft. The impact shaft can apply impact force to the worm shaft whose worm element is engaged in the clamping means in order to loosen the worm element on the worm shaft. The clamping means comprises a plurality of clamp jaws which are mounted in the cross member and are aligned longitudinally with the impact shaft, the clamp jaws having an inner profile surface which corresponds to the profile of the worm element.

The extractor device of the invention permits the removal of the worm elements without the use of hydraulic means. Since a supply of compressed air is available in practically every plant, no additional equipment is necessary for the development of the required detaching force.

By the provision of a pneumatically actuatable impact device as a supplement to the piston-cylinder unit, and by placing the impact device in abutment on the piston-cylinder unit which can be secured in place, it is possible under the continuous action of pneumatic force from the piston-cylinder unit, and the periodic action of impact force by the impact device on the parts to be separated, to avoid the development of high separation forces and possible damage of the parts. This is further favored by the fact that the clamping means assures a dependable holding of the worm elements.

In accordance with a feature of the invention, the slide which supports the impact means is composed of two spaced side plates which serve to guide the travel of the slide and the impact means therewith, the side plates being secured together by a housing of the impact means which essentially forms the construction of the slide without additional structural expense. In this way the slide can be easily converted in accordance with the different lengths of the worm.

In accordance with a further feature by which accurate alignment of the impact shaft with the worm shaft is obtained, the side plates are provided with stub shafts on which guide rollers engage the longitudinal frame members from above and below.

According to a further feature of the invention, the air hammer construction of the impact means can have adjustable impact force and after the initial loosening of the worm elements from the worm shaft, the piston of the piston-cylinder, which continually acts on the worm shaft, substantially serves to push out the worm shaft. A minimal impact force which is adjustable in conventional fashion by simple change of the pressure of the compressed air is sufficient to effect the loosening of the worm elements.

By virtue of the longitudinal displacement of the piston-cylinder unit on the frame by its support slide, the extractor device can be used for worms of different lengths.

The invention further contemplates the utilization of a heating unit which is directly connected to the extractor device so that the worm elements can be heated for a short time before being clamped in the clamping means. Because of the direct connection of the heating unit to the extractor device, the transfer time which was heretofore necessary in transporting the heated worm elements from the heater to the extractor device is eliminated.

Further features and advanges of the invention will become apparent from a consideration of the detailed description which follows hereafter of a preferred embodiment which is illustrated in the attached drawing.

DETAILED DESCRIPTION OF A PREFERRED EMBODIMENT

Figure 1:
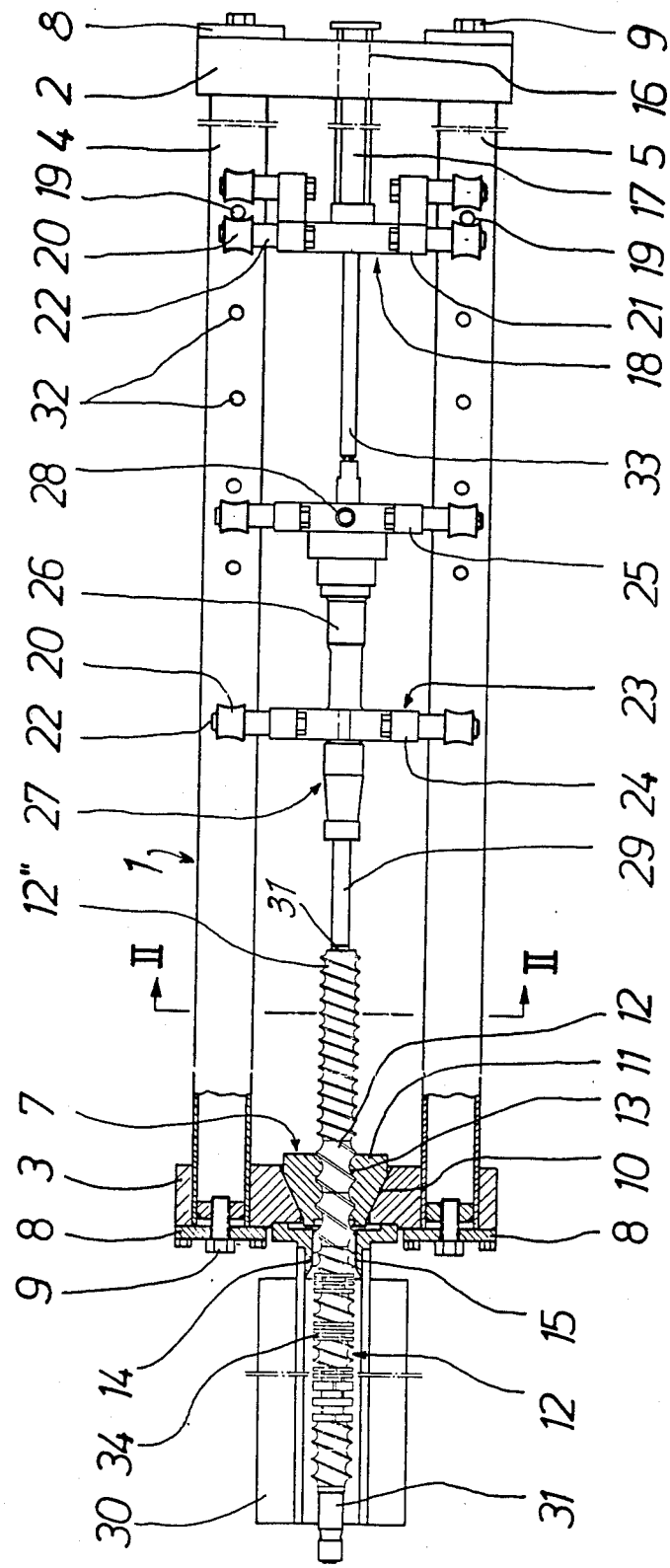
FIG. 1 is a top plan view, partly broken away in section, of an extractor device according to the invention.

The extractor device shown in the drawing comprises a frame 1 composed of a plurality of longitudinal tubular members 4,5 connected together by cross members 2 and 3. The cross members 2 and 3 are secured at the ends of the tubular members 4 and 5. The cross member 3 contains a locking device 7 therein. A third longitudinal tubular member 6 (FIG. 2) serves to reinforce the frame 1 against bending under load. The longitudinal members 4, 5 and 6 are secured to cross members 2, 3 by bolts 9 which are threadably engaged in the longitudinal members and bear against flanges 8 secured to the cross members.

The cross member 3 has a conically tapered hole 10 whose outside diameter and shape corespond to the outer surface of clamp jaws 11 which form the locking device 7. The clamp jaws 11 can be formed, for example, by two half jaws for receiving and holding worm elements 12, the half jaws having an inner profiled surface 13 corresponding to the profile of the worm elements 12. The clamp jaws 11 are, in this case, inserted loosely into the hole 10 and, due to their conical outer surface, they are firmly anchored in the cross member 3 solely under the action of axial pressure as will become clear later. Directly adjoining the clamp jaws 11 is a guide sleeve 14 which can be threadably secured to the cross member so that the bore 15 of the sleeve is aligned with the inner profiled surface 13 of the clamp jaws 11. The bore 15 facilitates the introduction of the worm 12 on worm shaft 31 into the jaws 11 and the sleeve 14 serves as a connecting part for a heating unit 30.

Figure 2:
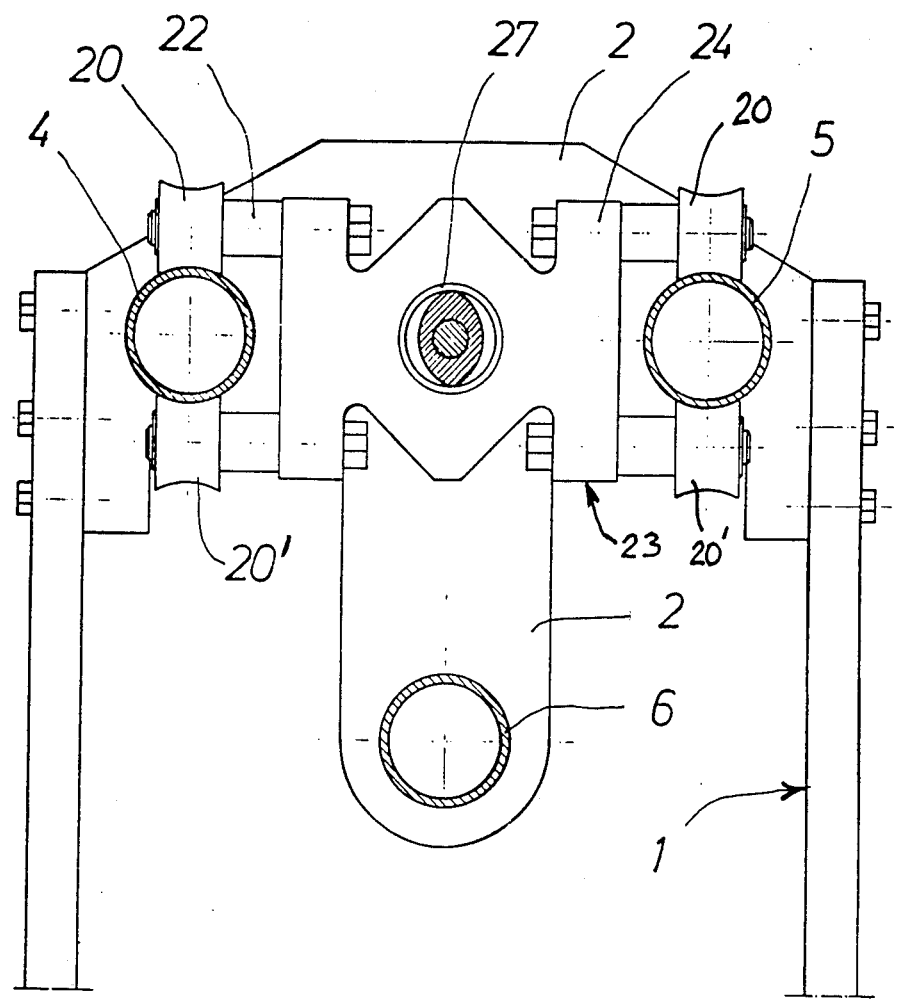
FIG. 2 is a sectional view taken along line II—II in FIG. 1.

A hole 16 is formed in the cross member 2 to slidably receive a piston-cylinder unit 17 which is secured to a cross slide 18 which is displaceable along the longitudinal axis of the frame 1 between the longitudinal members 4, 5 and 6. The cross slide 18 comprises a transverse support 21 having pairs of laterally projecting stub shafts 22 at each side with guide rollers 20, 20' supported thereon. The guide rollers 20, 20' are respectively arrayed above and below the longitudinal members 4, 5 as shown in FIG. 2 for a second slide 23 to be described in detail later.

In order to secure the cross slide 18, and thus the piston-cylinder unit 17 in a fixed longitudinal position on the frame 1, removable insertion pins 19 can be selectively engaged in a plurality of longitudinally spaced holes 32 in the respective tubular members 4 and 5. Since the cross slide 18 slides by means of the guide rollers 20, 20' on the longitudinal members 4 and 5, the cross slide 18 can be held fast in any desired longitudinal position by means of the guide pins 19 which fit between spaced rollers 20 at each side.

Adjacent to the cross slide 18 is the second cross slide 23, which, however, is freely movable on the longitudinal members. The cross slide 23 is guided in the same manner on the tubular members 4, 5 and 6 by guide rollers 20, 20'.

The cross slide 23 consists of longitudinally spaced side plates 24, 25 which are rigidly connected to each other by a housing 26 of an impact device 27. The guide rollers 20, 20' are supported on stub shafts 22 anchored in the side plates 24, 25. A connection 28 serves for feeding compressed air into the impact device 27 from a controllable source of compressed air (not shown). In this case, the frequency of the intensity of impact of the impact device 27 can be transmitted to an impact shaft 29 of the impact device 27 by the compressed air. The compressed air is introduced into the impact device in adjustable fashion as known in the art.

The operation of the extractor device is substantially improved if the worm elements are heated prior to separation and according to the invention the heating is associated with the extractor rather than separated therefrom as heretofore was the case in the known art. For this purpose, a heating unit 30 is directly connected to the guide sleeve 14 of the cross member 3 so that no shifting in space of the worm elements 12, 12', 12" of the worm to a separate heater is necessary.

The operation of the extractor device is as follows:

The worm elements 12, 12', 12" which are to be removed from the worm shaft 31 are heated in the heating unit 30 to a temperature of about 400° C. and, after having been heated for about 10 to 15 minutes, are displaced into the bore 15 of the guide sleeve 14 and the bore 10 formed in the split clamp jaws 11 in the cross member 3. The cross slide 23 which is movable on the longitudinal members 4 and 5 is then pushed up against the worm shaft 31 which protrudes beyond the clamp jaws 11, so that the impact shaft 29 of the impact device 27 can directly strike against the worm shaft 31. The cross slide 18 with the piston-cylinder unit 17 secured thereto is moved to a position adjacent slide 23, the piston 33 of the piston-cylinder unit 17 being in an initially retracted position. The slide 18 is fixed in its longitudinal position by inserting the pins 19 in the appropriate selected holes 32. The piston 33 is then extended to apply pressure to slide 23 and press the impact shaft 29 against the worm shaft 31. The impact device 27 is then actuated at an initially low pneumatic pressure, while concurrently the pressure piston 33 of the piston-cylinder unit 17 is acted on by compressed air. The impact forces will produce loosening of the worm elements 12 on the shaft and when the worm elements 12 can be seen to have been loosened, the impact force can be reduced by manually reducing the pressure at connection 28 so that the force of advance of the pressure-actuated pressure piston 33 produces a pushing out of the worm shaft 31. Since the separation of the worm shaft 31 is only expedited by the impact shaft 29 of the impact device 27, the pushing-out of the worm shaft 31 takes place with continuous cooperation of the piston-cylinder unit 17 whose pressure piston 33 uniformly pushes the worm shaft 31 out with a pressure of about 6 bar and a forward thrust load of 30 kg.

In this way, kneading disks 34 arranged behind the worm elements 12 locked by the clamp jaws 11 can be pulled off. The extensive displaceability of the slide 18 and thus of the piston-cylinder unit 17 permits the use of the extractor device for worm shafts of different lengths.

Although the invention has been described in relation to a specific embodiment thereof, it will become apparent to those skilled in the art that numerous modifications and variations can be made within the scope and spirit of the invention as defined by the attached claims.

What is claimed:

1. An extractor device for separating a worm element from a worm shaft comprising a frame including a plurality of longitudinal frame members and a pair of longitudinal spaced cross members secured to said longitudinal members, clamping means supported by one of said cross members for engaging a worm element to be separated from a worm shaft, a piston-cylinder unit supported on said frame for longitudinal travel on said longitudinal frame members, means for securing the piston-cylinder unit in a selected longitudinal position to said frame, a slide mounted on said frame between the clamping means and the piston-cylinder unit for longitudinal travel on said longitudinal members, pneumatically actuable impact means on said slide including an impact shaft extending longitudinally for engaging the worm shaft whose worm element is engaged in the clamping means to apply impact force to the worm shaft to loosen the worm element on the worm shaft, said piston-cylinder unit in said selected longitudinal position applying longitudinal force to the impact means which is transmitted thereby to the worm shaft so that said longitudinal force acts concurrently with the application of the impact force, said clamping means including a plurality of clamp jaws on said one cross member aligned longitudinally with said impact shaft and said piston-cylinder unit, said clamp jaws having an inner profiling which corresponds to the profiling of the worm elements.

2. An extractor device as claimed in claim 1 wherein said slide comprises a pair of longitudinally spaced side plates supporting said impact means, said impact means including a housing securing said side plates together.

3. An extractor device as claimed in claim 2 comprising laterally projecting stub shafts on said side plates and guide rollers on said stub shafts rollably engaging said longitudinal members from above and below.

4. An extractor device as claimed in claim 3 wherein said impact means comprises an air hammer having adjustable impact force.

5. An extractor device as claimed in claim 1 comprising a second slide supporting said piston-cylinder unit, said second slide including rollers rollably supported on said longitudinal members.

6. An extractor device as claimed in claim 5 wherein said means for securing the piston-cylinder unit in a selected longitudinal position on the frame comprises a series of longitudinally spaced holes in said longitudinal members and removable pins insertable into selected holes to engage said rollers and hold the second slide and said piston-cylinder unit in said selected longitudinal position.

7. An extractor device as claimed in claim 1 wherein said piston-cylinder unit is pneumatically actuated.

8. An extractor device as claimed in claim 1 wherein said one cross member has a conical hole, said clamping jaws being loosely engaged in said conical hole, said jaws having conical peripheral surfaces of the same size and shape as the conical surface of said hole.

9. An extractor device as claimed in claim 8 wherein said conical hole, said impact shaft and a piston of said piston-cylinder unit are axially aligned.

10. An extractor device as claimed in claim 9 wherein said longitudinal members of said frame define a longitudinal axis along which are axially aligned said conical hole, said impact shaft and said piston-cylinder unit.

11. A method of separating a worm element from a shaft on which the worm element is secured, said method comprising,
clamping the worm element in a clamping device,
pressing an impact shaft of an air hammer against the worm shaft on which the worm element is secured,
applying a continuous force, developed by pneumatic pressure in a piston-cylinder unit, against the air hammer to produce the pressure of the impact shaft against the worm shaft,
pneumatically actuating the air hammer to apply impact force to the worm shaft through the impact shaft to loosen the worm element on the shaft,
halting the impact force when the worm element is loosened from the worm shaft, and
pushing the worm shaft out of the worm element under the pneumatic pressure developed in the piston-cylinder unit.

12. A method as claimed in claim 11 wherein the pneumatic pressure developed on the piston-cylinder unit to push the worm shaft out of the worm element acts through the air hammer on the worm shaft.

* * * * *